(12) United States Patent
Zak et al.

(10) Patent No.: US 6,360,337 B1
(45) Date of Patent: Mar. 19, 2002

(54) SYSTEM AND METHOD TO PERFORM HISTOGRAMMIC COUNTING FOR PERFORMANCE EVALUATION

(75) Inventors: Robert C. Zak, Bolton; Hien H. Nguyen, Auburndale; Monica C. Wong-Chan, Concord, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/238,246

(22) Filed: Jan. 27, 1999

(51) Int. Cl.[7] ............................. G06F 11/00; G06F 11/30
(52) U.S. Cl. ......................................... 714/47; 713/502
(58) Field of Search ........................... 714/47, 10, 814, 714/39, 37; 710/18, 19; 713/502; 712/227; 702/176, 186; 340/825.06; 711/118

(56) References Cited

U.S. PATENT DOCUMENTS

| | | | |
|---|---|---|---|
| 4,872,121 A | | 10/1989 | Chan et al. |
| 5,682,328 A | * | 10/1997 | Roeber et al. |
| 5,796,939 A | | 8/1998 | Berc et al. |
| 5,991,808 A | * | 11/1999 | Broder et al. |
| 6,000,044 A | | 12/1999 | Chrysos et al. |
| 6,233,531 B1 | | 5/2001 | Klassen et al. |

OTHER PUBLICATIONS

Ludloff, "News.Com Tech News First: Appendix H . . . and no end in sight," found and downloaded from http://www.sandpile.org, last updated Aug. 22, 1998 and printed Sep. 29, 1998, 4 sheets.

Ludloff, "News.Com Tech News First: Performance Monitoring," found and downloaded from http://www.sandpile.org, last updated Aug. 22, 1998 and printed Sep. 29, 1998, 3 sheets.

Ludloff, "Worldwide Computer Superstores: Pentium Performance Monitoring events," found and downloaded from http://www.sandpile.org. last updated Aug. 22, 1998, and printed Sep. 29, 1998, 4 sheets.

Ludloff, "Worldwide Computer Superstores: Pentium MSRs," found and downloaded from http://www.sandpile.org, last updated Aug. 22, 1998, and printed Sep. 29, 1998, 9 sheets.

* cited by examiner

Primary Examiner—Gopal C. Ray
(74) Attorney, Agent, or Firm—Conley, Rose & Tayon, PC; B. Noël Kivlin (57) ABSTRACT

A performance counter to monitor a plurality of events that may occur in a component within a computer system during a monitoring period or testing period. The monitoring results, which are provided upon completion of the performance testing, may be used to provide histogram representations of the component performance. In one embodiment, the performance counter comprises a first storage, a second storage, programmable control logic, and a counting mechanism. The first storage is configured to store information indicative of a plurality of events to be monitored and the monitoring period for each event. The second storage is configured to store counting results obtained during the testing period. A counting mechanism, which is coupled to the second storage, is configured to monitor the occurrence of the events in the component under test. The counting mechanism is coupled to the control logic and the control logic is coupled to the first storage.

22 Claims, 6 Drawing Sheets

SYSTEM AND METHOD TO PERFORM HISTOGRAMMIC COUNTING FOR PERFORMANCE EVALUATION

BACKGROUND OF THE INVENTION

1. Field of the Invention

This invention generally relates to hardware performance counters and, more specifically, to performance counters that provide two-dimensional monitoring capabilities.

2. Description of the Related Art

As the number and sophistication of processors, memories, buses, and other components increase, computer systems that may integrate many of these components have become more and more complex. For example, a popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is also shared among the processors in the system. Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. These systems, as well as other complex computer systems, typically employ complex protocols for purposes such as optimizing the system overall performance.

In the course of implementing these complex protocols, the way resources in the computer system are used and the way data contention occurs affect the overall system performance. A particular concern is the occurrence of "bottleneck" conditions. Bottleneck conditions may significantly alter the total time (i.e. the speed) that is needed to complete the execution of a set of instructions or a computation task. Further bottleneck conditions may occur in more than one component in the computer system. The occurrence and severity of bottleneck conditions depend on several factors such as the characteristics of the computer system, the task being performed, and the type of instructions being executed.

Performance counters have been used to identify bottleneck conditions in computer systems. They may be used to evaluate a system's performance and subsequently to optimize its performance. Performance counters can be implemented either hardware or software. Both hardware and/or software performance counters have been used in evaluating and optimizing the performance of computer systems.

Software performance counters typically monitor a particular component through the execution of a set of instructions. Since the software performance counter has itself to be executed by the computer system, an operating aspect of the component being monitored may be needed to execute the software. Therefore software performance counters have a potential to interfere with the operation of the component being monitored. Such interference may affect the accuracy of the evaluation results that are sought by employing the software performance counter.

Hardware performance counters may be employed to monitor specific signals associated with the operation of a component. Hardware performance counters may be designed as embedded units within the components to be monitored or within the computer system. Typically, no execution of software is needed to operate the hardware performance counter. Accordingly, they tend to interfere less with the operation of the components being monitored when compared to software performance counters.

To monitor the performance of a component within a computer system, the hardware performance counter may be set to monitor the occurrence of a specific event within the component for a specific period of time, or monitoring period. Unfortunately, in many situations, the monitoring data obtained by such performance counters typically does not provide enough information to precisely and thoroughly evaluate bottleneck and/or other operating conditions. Therefore, the designer may have insufficient information to modify the system for optimal performance, or may otherwise consume much time and effort to optimize the system design. Accordingly, a hardware performance counter is desired to provide a more comprehensive evaluation of a computer system component.

SUMMARY OF THE INVENTION

The problems outlined above are in large part solved by a performance counter to monitor a plurality of events that may occur in a component within a computer system during a monitoring period or testing period. The monitoring results, which are provided upon completion of the performance testing, may be used to provide histogram representations of the component performance. In one embodiment, the performance counter comprises a first storage, a second storage, programmable control logic, and a counting mechanism. The first storage is configured to store information indicative of a plurality of events to be monitored and the monitoring period for each event. The second storage is configured to store counting results obtained during the testing period. A counting mechanism, which is coupled to the second storage, is configured to monitor the occurrence of the events in the component under test. The counting mechanism is coupled to the control logic and the control logic is coupled to the first storage.

The control logic is configured to control the counting mechanism based upon the information stored in the first storage such that two or more events are counted during the monitoring period. The counting results include a count for each event from the events being monitored during the monitoring period. Thus, the count is indicative of a frequency of occurrence of the corresponding event. Advantageously, the performance counter provides two-dimensional data on the performance of the component under test. Accordingly, the monitoring data may be used to develop a histogram performance representation that provides the designer with accurate and precise evaluations of the system performance.

The performance counter may be embedded within a system memory, a cache, a cache controller, a bus, a buffer, an interconnect, a queue, a snoop controller, a processor, an input/output device, or other component within the computer system. Further, two or more performance counters may be employed to monitor two or more components within the computer system during the same monitoring or testing period.

BRIEF DESCRIPTION OF THE DRAWINGS

Other objects and advantages of the invention will become apparent upon reading the following detailed description and upon reference to the accompanying drawings in which:

FIG. 3 is a block diagram of a histogrammic performance counter that is implemented to monitor cache performance within a computer system; and While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 1:
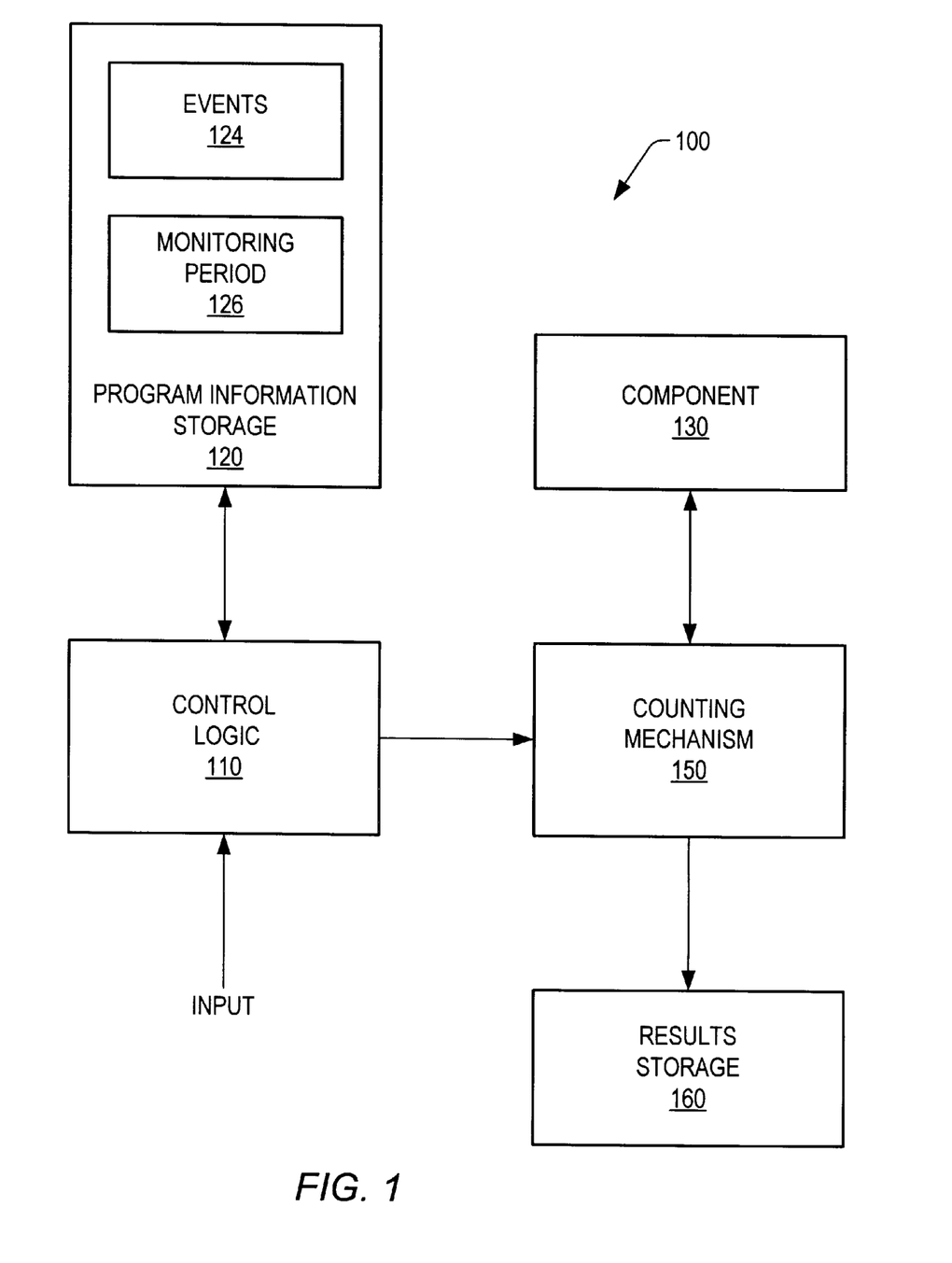
FIG. 1 is a block diagram of a histogrammic performance counter that enables monitoring of bottleneck conditions for a plurality of events in a component within a computer system during a monitoring period.
Figure 1A:
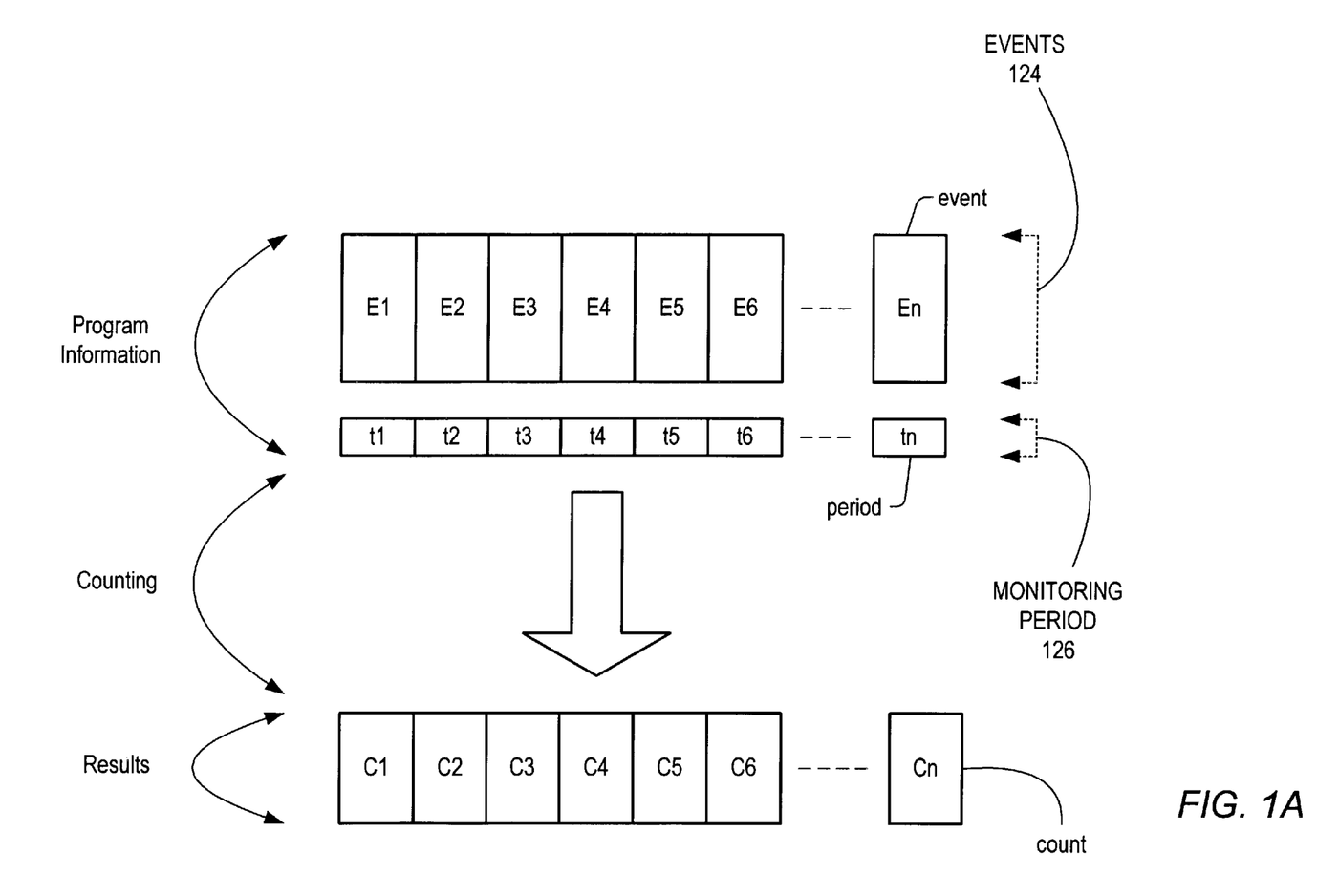
FIG. 1A is an illustration of the relationship between a plurality of events and their corresponding counts in the histogrammic performance counter of FIG. 1.

Turning now to FIGS. 1 and 1A, a block diagram of a histogrammic performance counter is shown in FIG. 1 that enables monitoring of bottleneck conditions in a component within a computer system during a monitoring period. FIG. 1A shows the relationship between a plurality of events that may be monitored by the performance counter system 100 and the corresponding results that may be used to identify bottleneck conditions within the component under test.

The performance counter system 100 includes control logic 110, program information storage 120, counting mechanism 150, and results storage 160. Also shown in FIG. 1 is a component 130 to be monitored by the histogrammic performance counter 100. The control logic 110 is coupled to the program information storage 120 and the counting mechanism 150. The program information storage 120 may be programmed, through the control logic 110, to store program information (FIG. 1A) about the events to be monitored and about the monitoring period for each of those events. For illustration, FIG. 1 shows the content of the program information storage 120 to include the events 124 and the monitoring period 126. The counting mechanism 150 is coupled to the results storage 160. Further, the counting mechanism 150 is coupled to the component to be monitored, i.e. the component 130 as shown in FIG. 1.

As used in this description, the component 130 may be any hardware that is used to process, store, or move data in a computer system. For example, the component 130 may be a first-in first-out (FIFO) queue, a reissue queue, a data cache, an instruction cache, a cache controller, a snoop controller, a bus, a global interconnect, a buffer, an input/output device, an interface, or a system memory within the computer system.

Further, an event is defined as an occurrence of a particular state (or condition) in the component being monitored. FIG. 1A shows the events E1 to En programmed into the program information storage 120. For example, if the component 130 is a FIFO queue, the event of interest may be the number of entries in the queue. If the queue is designed to hold a maximum of ten entries, the queue is full if the number of entries at any point of time during its operation is ten. The queue is empty if the number of entries at any point of time during its operation is zero, and the queue is half-full if the number of entries at any point of time during its operation is five. In this example, the plurality of events 124 (to be stored in the program information storage 120) may be defined based on the number of entries in the queue. Thus, ten entries in the queue may be defined as event 1, zero entries in the queue may be defined as event 2, and five entries in the queue may be defined as event 3, and so on.

Further in example, if the component 130 is a data cache, events of interest may be a cache hit or cache miss for a specific address that corresponds to a data line in the cache. Accordingly, an occurrence of a cache hit on a line that corresponds to address A may be defined as event 1. Similarly, an occurrence of a cache hit on a data line that corresponds to address B may be defined as event 2. An occurrence of a cache miss on the line that corresponds to address A may be defined as event 3, and the occurrence of a cache miss on the line that corresponds to address B may be defined as event 4, and so on.

Generally speaking, as shown in FIG. 1A, the events 124 that are stored in the program information storage 120 may be represented as:

$$\text{Events} = \{E1, E2, E3, E4, \ldots, En\}$$

where "n" is the total number of events 124 of interest, i.e. the events that are stored in the program information storage 120 to be monitored during the monitoring period 126 as shown in FIG. 1A. For example, in the data cache above, there may be several addresses where a miss may occur; however, if only address A and address B are of interest for the performance monitoring purpose, then the events 124 are E1 and E2, where E1 and E2 are the occurrence of cache miss on address A and address B, respectively.

The monitoring period 126 (that is stored within the program information storage 120) is defined as the period over which the component 130 is monitored. In FIG. 1A, the monitoring period 126 includes a plurality of monitoring cycles (or sub-monitoring periods), t1 to tn, over which the monitoring of component 130 is performed. Accordingly, the monitoring period 126 (or any of the plurality of sub-monitoring periods) may directly or indirectly represent time. For example, each sub-period (t1 to tn) of the monitoring period 126 may be a quantity of clock time (such as 10 seconds), or may be a number of bus cycles (such as 1000 cycles). Accordingly, the event E1 may be monitored during the sub-period t1, the event E2 may be monitored during the sub-period t2, the event En may be monitored during the sub-period tn, and so on. The arrow in FIG. 1A illustrates the counting process for each event E1–En during the corresponding period t1–tn. Upon completion of the counting of each event, the total count for that event is stored. Accordingly, the monitoring of the events E1–En, during the sub-period t1–tn, results in the counts C1–Cn; respectively.

The program information storage 120 may be any type storage that enables storing (or holding) of the events 124 and the monitoring period 126. The program information storage 120 is programmable such that events 124 and the monitoring period 126 are programmed prior to starting the performance monitoring. The information content of the program information counter 120 may be inputted through the control logic 110. However, it should be noted that any data inputting procedure or method may be used to input data into the program information storage 120.

The control logic 110 provides the control signals necessary to control the operation of the performance counter 100. In one embodiment, the control logic 110 may be coupled to a time indicator unit or a bus cycle counter. The control logic 110 is configured to control the counting mechanism 150 such that monitoring and counting of the component 130 are performed according to the information stored with the program information storage 120. Accordingly, the counting mechanism 150 may be viewed as being programmable to provide monitoring and counting functions during the performance testing of the component 130 based on the information stored within the program information storage 120.

In one particular embodiment, the monitoring period 126 that is programmed in the performance counter 100 includes equal sub-monitoring periods. The latter may be a constant period of time for each sub-monitoring period or a constant number of cycles for each sub-monitoring period. Thus, in this embodiment, each of the events 124 within the program information storage 120 may be monitored for an equal share of the monitoring period 126. For example, the events 124 may include E1 to E10, wherein each of the plurality E1–E10 is monitored for a 0.01 second or for a 1000-cycle.

In another particular embodiment, the monitoring period 126 that is programmed in the performance counter 100 may include unequal sub-monitoring periods. The latter may be a variable period of time for each sub-monitoring period or a variable number of cycles for each sub-monitoring period. Thus, in this embodiment, the plurality of the events 124 within the program information storage 120 may be monitored for unequal shares of the monitoring period 126. For example, the events 124 may include E1 to E5, wherein E1, E2, E3, E4, and E5 are monitored for 0.01, 0.02, 0.01, 0.03, and 0.03 second; respectively.

Furthermore, the control logic 110 may be configured to cause the counting mechanism 150 to monitor and count the events 124 in a specific sequence according to a predetermined criterion. For example, the events {E1, E2, E3, E4, E5} may be monitored in the sequence E1, E2, E3, E4, and E5 relative to the starting of the monitoring testing. Alternatively, the events {E1, E2, E3, E4, E5} may be monitored in another sequence such as E2, E3, E1, E5, and E4 according to the predetermined criterion, and so on. The predetermined criterion may be programmed into the control logic 110. Alternatively, the predetermined criterion may be inherently implemented by the same sequence in which the events 124 are stored within the program information storage 120.

As discussed earlier, the monitoring and counting functions of the performance counter 100 are performed by the counting mechanism 150. The counting mechanism 150 is configured to monitor the events in the component 130 and to count the number of each event that occurs during the monitoring period. Generally speaking, the counting mechanism 150 may be any hardware counting device, system, or apparatus that enables counting of an event in a component such as the component 130 of the embodiment of FIG. 1.

The counting mechanism 150 is coupled to the results storage 160. The results storage 160 may be any register, or other storage, which is usable to accumulate and store counts. The content of the results storage 160 is retrievable at least at the conclusion of the monitoring period 126. In one embodiment, the results register 160 may include a plurality of storage locations such that the number of storage locations is equal to the number of the events 124 that are stored in the program information storage 120. Each of the storage locations within the results storage 160 may be used to store the total count that corresponds to one of the events 124. Preferably, the value in each of the results storage 160 locations is set to zero at the start of the performance testing. The latter may be achieved by a reset signal that is generated by the control logic 110.

At the conclusion of the performance testing, the content of the results storage 160 provides the number of counts for each of the events 124 that occurred in the component 130 over the monitoring period 126. Accordingly, a histogram representation may be obtained for the distribution of the frequency of occurrence for the events of interest during the monitoring period. The performance data stored within the results storage 160 at the conclusion of the monitoring period 126 may be represented (FIG. 1A) by:

Results=[C1, C2, C3, C4, . . . , CEn]

where CE1, CE2, . . . CEn is the total count (or the frequency of occurrence) for the events E1, E2, . . . , En; respectively. When the Es are plotted on the abscissa and the Cs are plotted on the ordinate, a histogram plot is obtained showing the events and their corresponding frequencies. If the ratio of each event frequency over the overall frequency of events is plotted on the ordinate, the histogram plot shows the relative frequency distribution of events over the monitoring period. Similarly, a corresponding portion of the monitoring period 126 (such as time period or a number of cycles) for a particular event may be plotted on the abscissa. Accordingly, the data provided by the performance counter 100 may be used to measure the performance characteristics of a component to identify bottleneck conditions and to generally optimize the component.

Figure 1B:
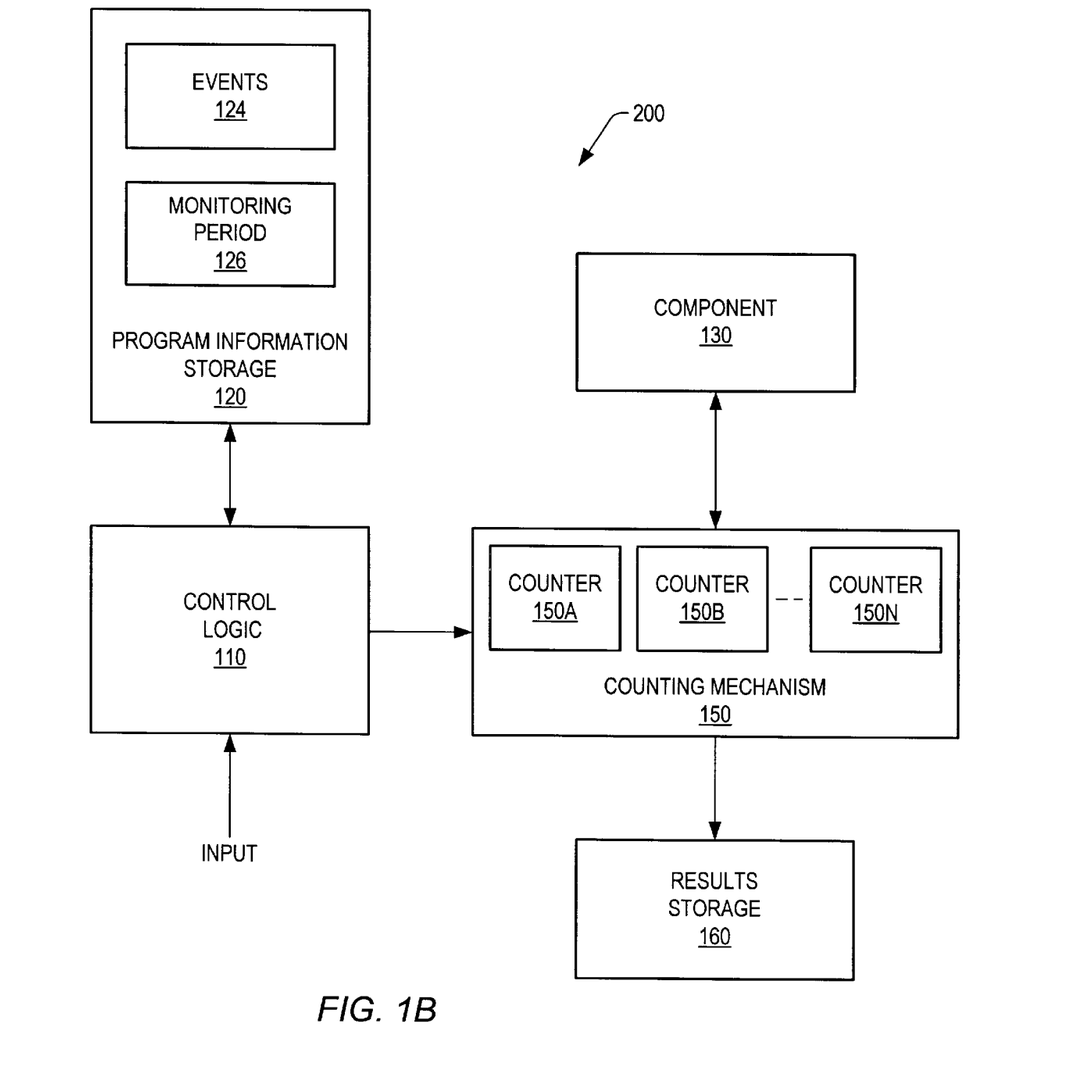
FIG. 1B is a block diagram of another embodiment of a histogrammic performance counters that enables monitoring of bottleneck conditions for a plurality of events in a component within a computer system during a monitoring.
Figure 1C:
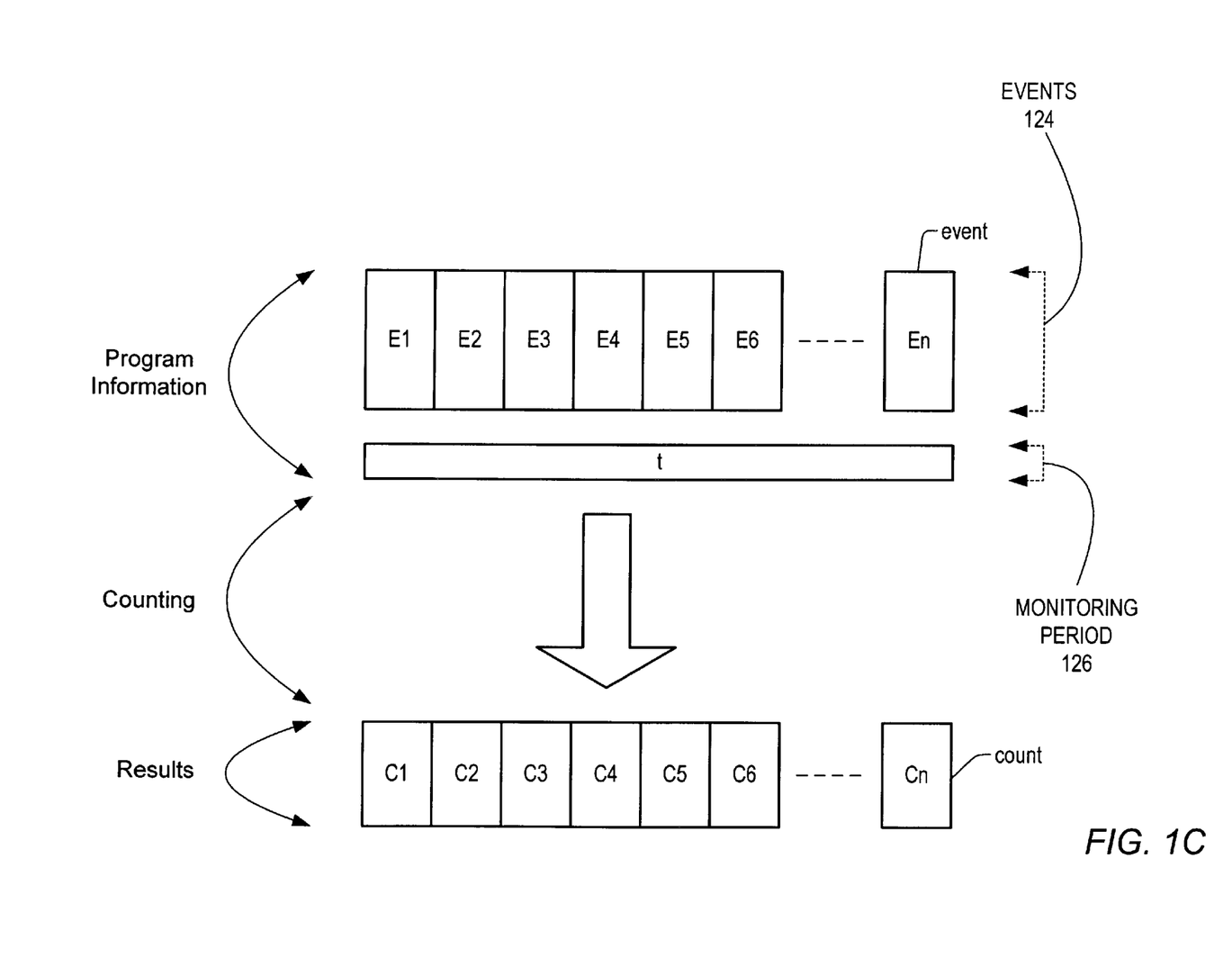
FIG. 1C is an illustration of the relationship between a plurality of events and their corresponding counts in the histogrammic performance counter of FIG. 1B.

FIG. 1B is a block diagram of another embodiment of a histogrammic performance counter 200. Circuit portions that correspond to those of FIG. 1 are numbered identically for simplicity and clarity. In this embodiment, the counting mechanism 150 includes a plurality of counters 150A to 150N. The events 24 that are programmed into the program information storage 120 are assigned to the plurality of counters 150A to 150N. Each counter within the counting mechanism 150 may be controlled to monitor a specific event from the plurality of events 124. For example, the counter 150A may be set to count the event E1, the counter 150B may be set to count the event E2, and the counter 15ON may be set to count the event En, and so on. In this embodiment, all the counters within the counting mechanism 150 are set active during the monitoring period 126. The monitoring period 126 does not include sub-periods that are assigned to the events 124, since the events are assigned to the counters. When a particular event occurs, the corresponding counter increments the results storage 160 value maintained for that event by one count. For example, when the event E1 occurs, the corresponding counter 150A increments the count C1. Similarly, when the event En occurs, the corresponding counter 150N increments the count Cn, and so on. FIG. 1C shows the relationship between content of the program information storage 120 and the results register 160 for the histogrammic performance counter 200 of FIG. 1B. As shown in the figure, all the events 124 are monitored during the whole monitoring period 126, which is referred to as "t". Each event is monitored by one of the plurality of the counters. At the conclusion of the monitoring period t, the results register 160 contains all the counts of the events that were monitored during the monitoring period t.

It should be noted that two or more of the performance counters, as shown in the embodiments of FIGS. 1 and 1B, may be used to monitor a plurality of events in two or more components within a computer system. Since the histogrammic performance counter is programmable, different sets of events may be monitored in the components to be monitored. For example, two histogrammic performance counters 100 may be used, one to monitor an in-queue and the other to monitor an out-queue, within a system interface as discussed below.

Figure 2:
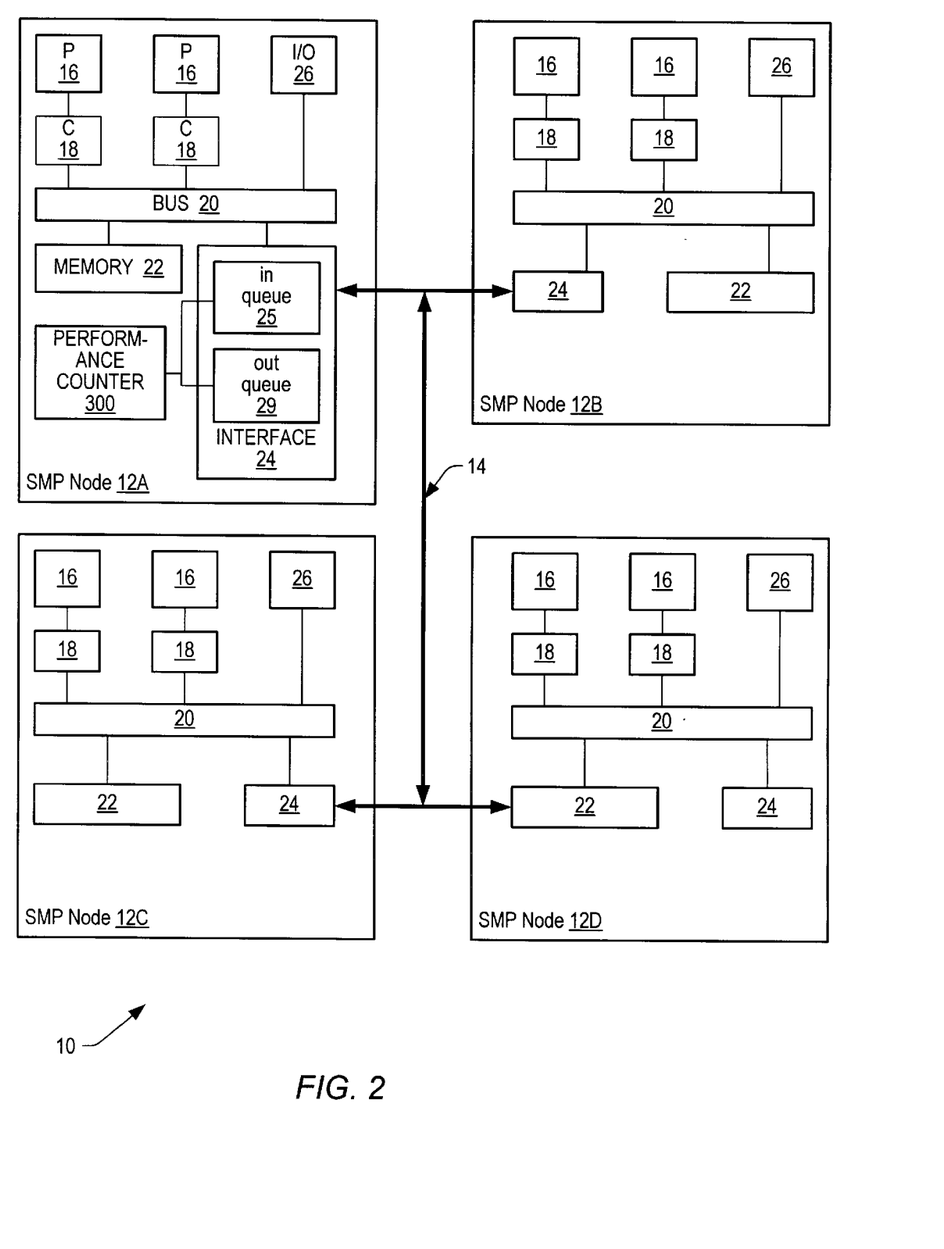
FIG. 2 is a block diagram of a histogrammic performance counter that is implemented within an interface of a mode in a multiprocessing computer system.

Turning now to FIG. 2, a block diagram of a histogrammic performance counter 100 is shown implemented within an SMP node of a distributed computer system 10. The computer system 10 includes multiple SMP nodes 12A–12D interconnected by a network 14. In the embodiment shown, each SMP node 12 includes multiple processors 16, caches 18, a bus 20, a memory 22, and the system interface 24. The interface 24 includes two pipeline transaction queues: in-queue 25 for incoming transactions into node 12A and out queue 29 for outgoing transactions from node 12A.

In this embodiment, the histogrammic performance counter 300 is configured to monitor the in-queue 25 and the out-queue 29 within the interface 24 in node 12A. The in-queue 25 is used to pipeline transactions that are presented upon the network 14 and addressed to the node 12A. The out-queue 29 is used to pipeline transactions generated in the node 12A which need to be transmitted to the other nodes through the network 14. Knowledge of the number of transactions (or the number of entries) pending within the in-queue 25 and within the out-queue 29 during operation of the system is important to the designer in making optimizations.

Figure 3:
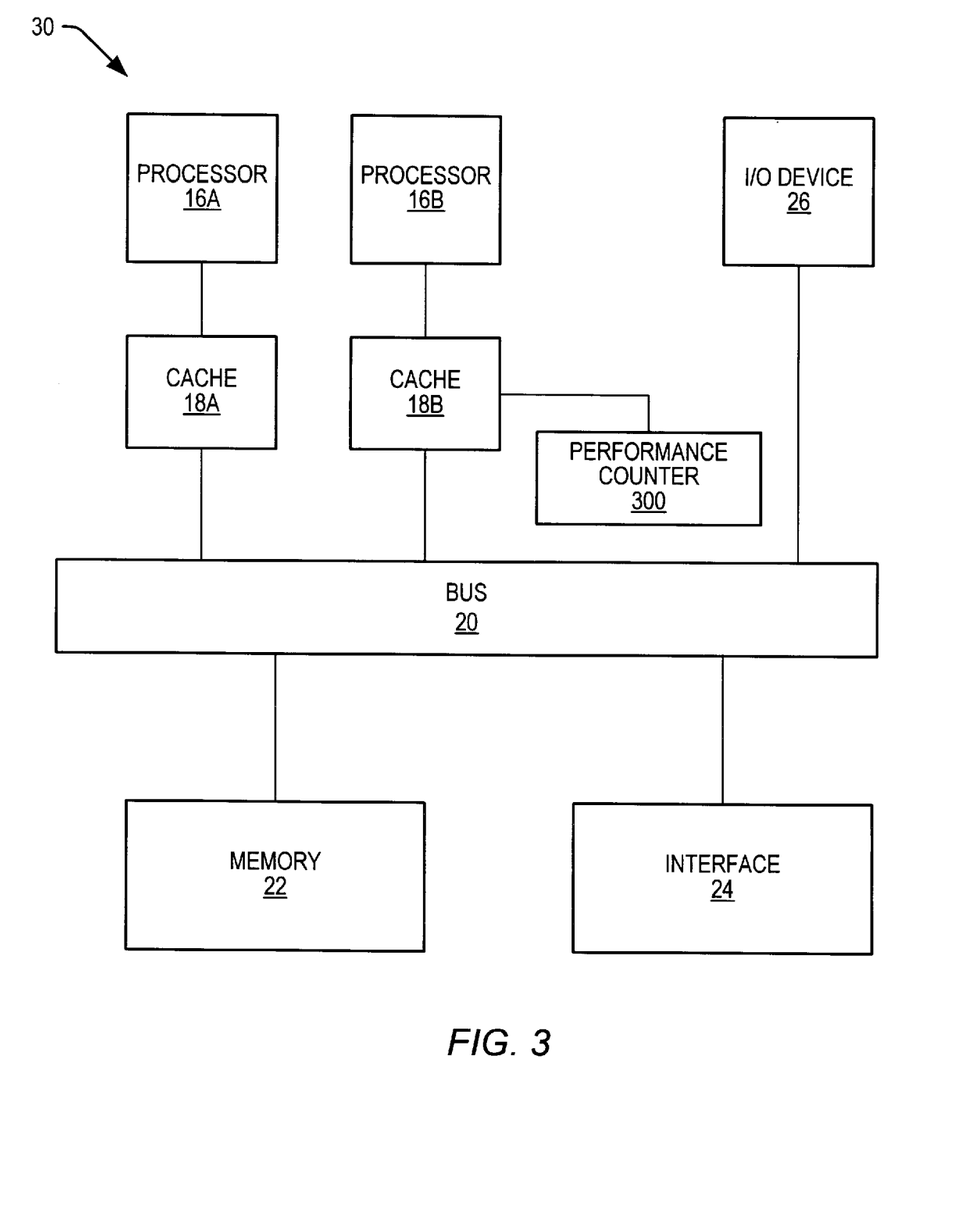

FIG. 3 illustrates an alternative embodiment wherein a histogrammic performance counter is used to measure the performance of a cache memory 18B. For example, the histogrammic performance counter 300 may be used to monitor the hits that occur in the cache memory 18B with respect to access particular address locations.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A performance counter for counting occurrences of two or more events in a queue within a computer system during a monitoring period, said performance counter comprising:
   a first storage configured to store information indicative of said two or more events to be monitored;
   a second storage configured to store counting results of said occurrences of said two or more events;
   a counting mechanism coupled to said second storage; and
   control logic coupled to said first storage and configured to control said counting mechanism based upon said information in said first storage such that said occurrences of said two or more events are counted during said monitoring period;
   wherein a first event of said two or more events occurs when the queue contains a first number of entries, and wherein a second event of said two or more events occurs when the queue contains a second number of entries.

2. The performance counter as recited in claim 1, wherein said counting results include a total count for each of said two or more events during said monitoring period.

3. The performance counter as recited in claim 1, wherein said counting mechanism increments a count value maintained for a particular event upon each occurrence of said particular event during said monitoring period.

4. The performance counter as recited in claim 1, wherein said monitoring period is a period of time.

5. The performance counter as recited in claim 1, wherein said monitoring period is a number of cycles within said computer system.

6. The performance counter as recited in claim 1, wherein said monitoring period further includes a plurality of sub-monitoring periods, wherein one or more occurrences of a first event of said two or more events are monitored during a first sub-monitoring period of said plurality of sub-monitoring periods and are not monitored during a second one of said plurality of sub-monitoring periods.

7. The performance counter as recited in claim 6, wherein one or more occurrences of a second event of said two or more events are counted during the second sub-monitoring period of said plurality of sub-monitoring periods.

8. A method for performance monitoring to count two or more events that are occurring in a queue within a computer system during a monitoring period, said method comprising:
   storing in a first storage information indicative of said two or more events to be monitored, wherein a first event of the two or more events occurs when the queue contains a first number of entries and a second event of the two or more events occurs when the queue contains a second number of entries;
   controlling a counting mechanism based upon said information in said first storage such that occurrences of each of said two or more events are counted during said monitoring period; and
   storing in a second storage counting results of each of said two or more events which occur in said queue.

9. The method as recited in claim 8, wherein said counting results include a total count for each of said two or more events during said monitoring period.

10. The method as recited in claim 8, wherein said counting mechanism increments a count value maintained for a particular event upon each occurrence of said particular event.

11. The method as recited in claim 8, wherein said monitoring period is a period of time.

12. The method as recited in claim 8, wherein said monitoring period is a number of cycles within said computer system.

13. The method as recited in claim 8, wherein said monitoring period further includes a plurality of sub-monitoring periods, wherein one or more occurrences of a first event of said two or more events are monitored during a first sub-monitoring period of said plurality of sub-monitoring periods and are not monitored during a second one of said plurality of sub-monitoring periods.

14. The method as recited in claim 13, wherein one or more occurrences of a second event of said two or more events are counted during the second sub-monitoring period of said plurality of sub-monitoring periods.

15. A multiprocessing computer system comprising:
   a plurality of processing nodes interconnected through a network, wherein a first processing node of said plurality of processing nodes includes:
   a transaction queue for storing pending transactions being conveyed between said first processing node and said network, and
   a performance counter coupled to said transaction queue and configured to count occurrences of two or more events in said transaction queue during a monitoring period, wherein said performance counter comprises:
a first storage configured to store information indicative of said two or more events to be monitored;
a second storage configured to store counting results of said occurrences of said two or more events;
a counting mechanism coupled to said second storage; and
control logic coupled to said first storage and configured to control said counting mechanism based upon said information in said first storage such that said occurrences of said two or more events are counted during said monitoring period.

16. The multiprocessing computer system as recited in claim 15, wherein said counting results include a total count for each of said two or more events during said monitoring period.

17. The multiprocessing computer system as recited in claim 15, wherein said counting mechanism increments a count value maintained for a particular event upon each occurrence of said particular event during said monitoring period.

18. The multiprocessing computer system as recited in claim 15, wherein said monitoring period is one of a period of time and a number of cycles within said multiprocessing computer system.

19. The multiprocessing computer system as recited in claim 15, wherein said monitoring period further includes a plurality of sub-monitoring periods, wherein one or more occurrences of a first event of said two or more events are monitored during a first sub-monitoring period of said plurality of sub-monitoring periods and are not monitored during a second one of said plurality of sub-monitoring periods.

20. The multiprocessing computer system as recited in claim 19, wherein one or more occurrences of a second event of said two or more events are counted during the second sub-monitoring period of said plurality of sub-monitoring periods.

21. A performance counter for counting occurrences of two or more events in a component within a computer system during a monitoring period, wherein the monitoring period comprises a plurality of sub-monitoring periods, the performance counter comprising:
a first storage configured to store information indicative of the two or more events to be monitored;
a second storage configured to store counting results of the occurrences of the two or more events;
a counting mechanism coupled to the second storage; and
control logic coupled to the first storage and configured to control the counting mechanism based upon the information in the first storage such that the occurrences of a first event of the two or more events are counted during the first sub-monitoring period but not during the second sub-monitoring period and such that occurrences of the second event of the two or more events are counted during the second sub-monitoring period.

22. A performance counter for counting occurrences of two or more events in a cache within a computer system during a monitoring period, said performance counter comprising:
a first storage configured to store information indicative of said two or more events to be monitored;
a second storage configured to store counting results of said occurrences of said two or more events;
a counting mechanism coupled to said second storage; and
control logic coupled to said first storage and configured to control said counting mechanism based upon said information in said first storage such that said occurrences of said two or more events are counted during said monitoring period;
wherein a first event of said two or more events occurs if a cache hit or miss for a first address occurs in the cache, and wherein a second event of said two or more events occurs if a cache hit or miss for a second address occurs in the cache.

* * * * *